J. A. SHERRY.
HAND PROPELLED WAGON.
APPLICATION FILED AUG. 9, 1910.
1,031,475.
Patented July 2, 1912.
2 SHEETS—SHEET 1.
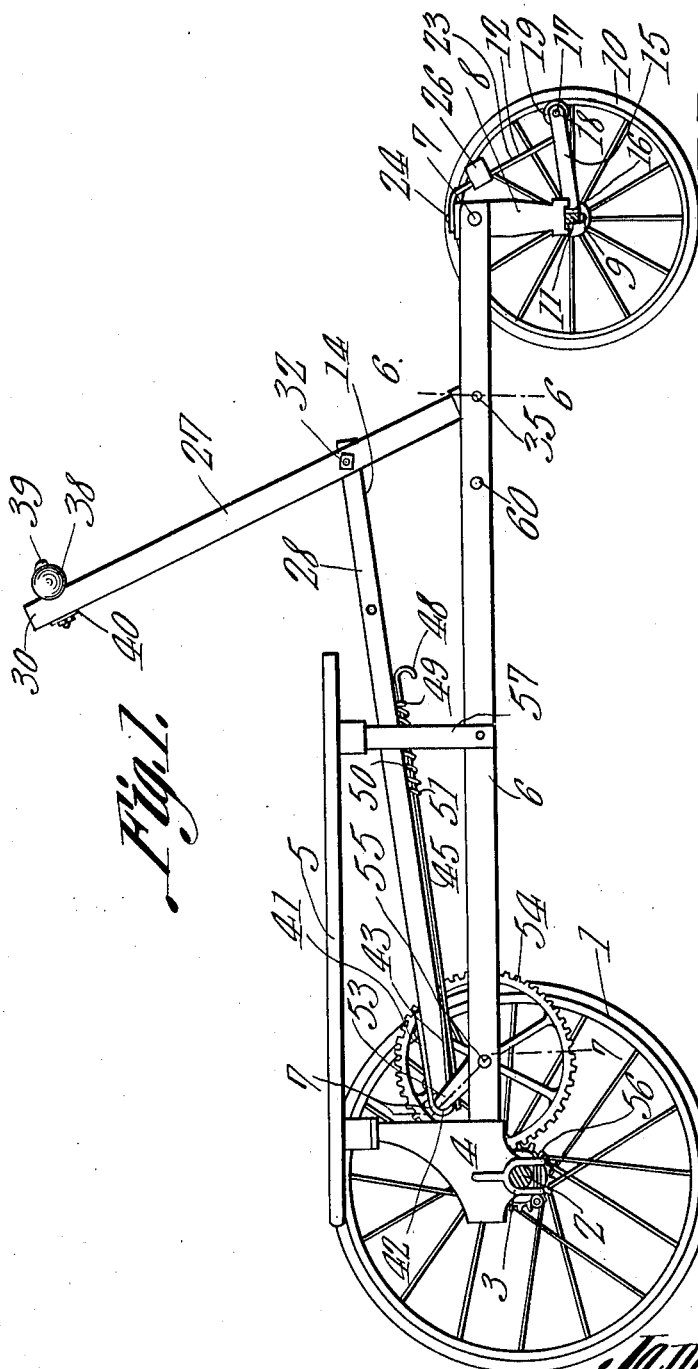
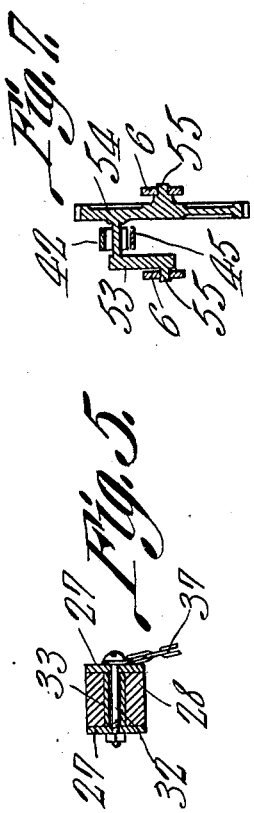
Witnesses
James A. Sherry, Inventor
by C. A. Snow & Co.
Attorneys
COLUMBIA PLANOGRAPH CO., WASHINGTON, D. C.

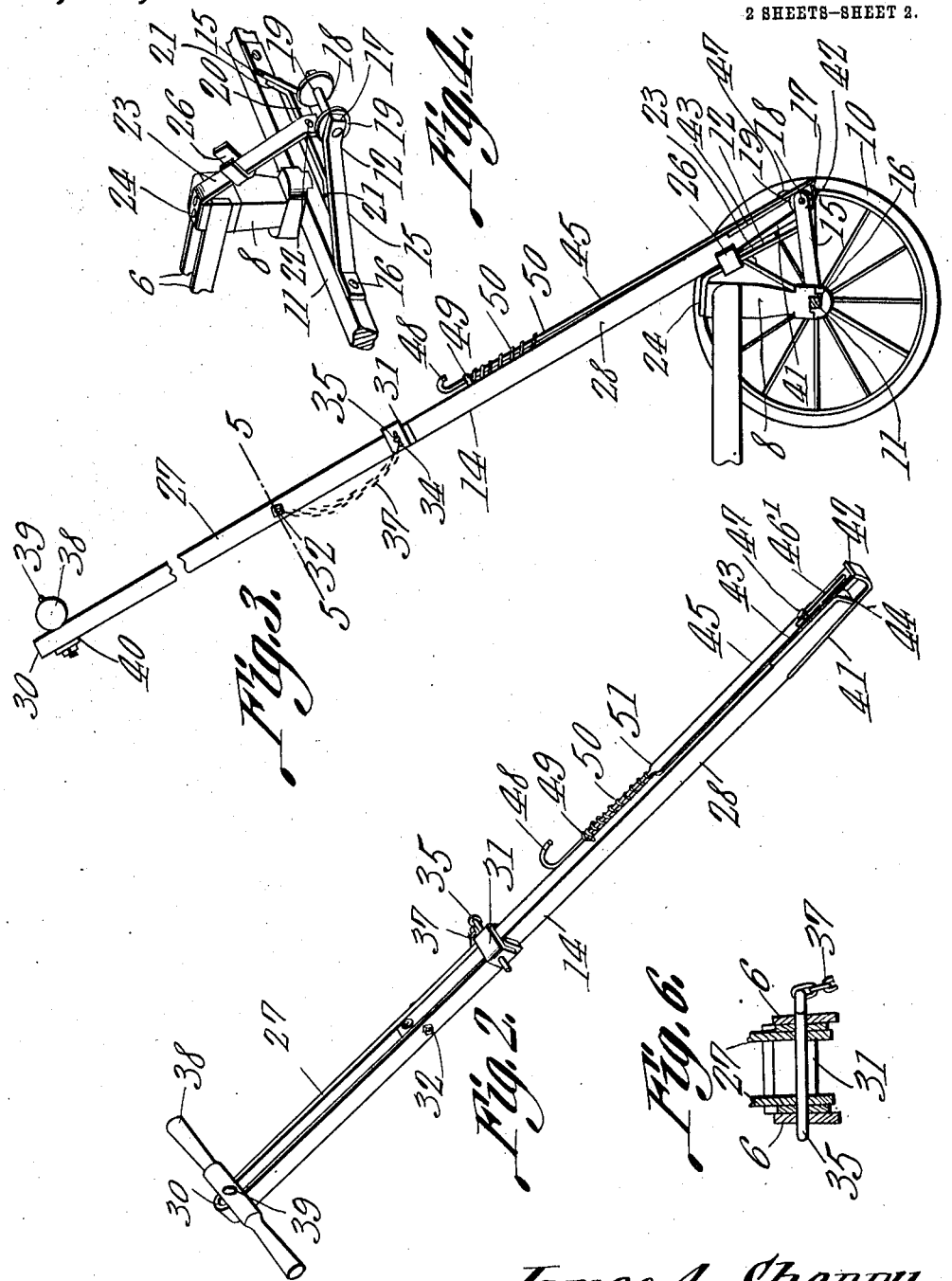

UNITED STATES PATENT OFFICE.

JAMES A. SHERRY, OF FALL RIVER, MASSACHUSETTS.

HAND-PROPELLED WAGON.

1,031,475.  Specification of Letters Patent.  Patented July 2, 1912.

Application filed August 9, 1910. Serial No. 576,363.

*To all whom it may concern:*

Be it known that I, JAMES A. SHERRY, a subject of the King of England, residing at Fall River, in the county of Bristol and State of Massachusetts, have invented a new and useful Hand-Propelled Wagon, of which the following is a specification.

This invention relates generally to vehicles and more particularly to hand propelled wagons such as are adapted to be propelled by the occupant, or drawn in the usual manner, as desired.

The principal object of the present invention is to provide a car of the character indicated, having a hand lever, and a link connecting said hand lever with the operating or propelling mechanism of the car, the construction and arrangement being such that the hand lever and link may be disconnected from the propelling mechanism and used as a handle for drawing the car or for steering it when it is used for coasting.

Further objects of the invention are generally to improve and simplify the construction of vehicles of the character indicated, as well as to reduce the number of parts, and to decrease the expense attending their manufacture.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming part of this specification:—Figure 1 is a side elevation of a hand car provided with the improvements of the present invention, the hand lever and links being shown in position for propelling the car. Fig. 2 is a perspective view of the link and lever after they have been detached from the propelling mechanism and locked in alinement with each other for the purpose of providing an elongated handle to be used in either drawing the vehicle or steering it when it is coasting. Fig. 3 is a side elevation of the forward end of the wagon shown in Fig. 1 with the link and lever locked in alinement with each other and engaged with the steering mechanism, the handle being shown in position for use in steering the vehicle when it is coasting down a hill. Fig. 4 is a detail view of the bracket to which the handle is detachably connected, showing the cradle in which the handle rests when in the position shown in Fig. 3. Fig. 5 is a transverse section on the line 5—5 of Fig. 3. Fig. 6 is a section on the line 6—6 of Fig. 1. Fig. 7 is a section on the line 7—7 of Fig. 1.

Like reference numerals indicate corresponding parts in the different figures of the drawings.

The hand car of the present invention preferably includes any suitable form of framework provided with steering and driving wheels, the particular improvements of the present invention residing especially in a hand lever detachably pivoted on the frame of the car and having a link pivotally connected therewith and extending to the driving mechanism of the car and being detachably connected therewith, whereby the link can be detached from the driving mechanism, and the hand lever can be detached from the frame, after which the link can be moved into alinement with the lever and locked in such position so as to produce an elongated handle which can be detachably connected with the steering mechanism for use in either pulling the vehicle over the ground, or in steering the vehicle when it is coasting down hill.

The reference numeral 1 indicates one of the rear wheels or drivers. The drivers 1 preferably are fixed on an axle 2 which is journaled in brackets 3 secured to a casting 4 which supports the rear end of the seat 5 of the vehicle. Extending forward from the casting 4 is a pair of spaced bars or frame members 6—6 between the forward ends of which is fixed by means of a bolt 7 a downwardly extending arm or bolster member 8 with the lower end of which is pivotally connected at 9 the forward axle carrying the steering wheels 10. The forward axle 11 as best shown in Fig. 4, has fixed thereto a bracket indicated generally by the reference numeral 12 which is intended, detachably, to receive the handle indicated generally by the reference numeral 14. The bracket 12 preferably includes a pair of diagonally extending arms 15 which converge toward each other and are suitably connected at their outer ends with the axle 11 as indicated at 16, the forward ends 17 of said arm being connected with each other by means of a cross piece 18 having disks 19 on the ends thereof intended to limit the lateral play of the lower end of the handle 14 when it is detachably connected with the cross piece 18 as will more fully hereinafter appear. The converging arms 15 are further connected with each other in rear of the cross piece 18 by means of a cross arm 20 secured to the members 15 as indicated at 21. Connected with the cross arm 20 as indicated at 22 is an upwardly and rearwardly extending member 23 which is pivotally connected at 24 with the upper end of the bolster member 8. The rearwardly inclined member 23, in combination with the outwardly extending bracket 12, as shown best in Fig. 3, serves to strengthen and brace the steering mechanism without interfering with its rotating movement. The rearwardly inclined arm 23 is provided with a pair of upstanding parallel arms 26—26 which serve as a cradle member to receive the handle 14 when it is in the position shown in Fig. 3 so as to adapt it to be used for steering the vehicle when coasting down hill, the cradle members 26 serving to prevent any lateral play or looseness of the handle 14. The handle 14 can of course be swung forward on the cross piece 18 as an axis, thus moving out of engagement with the cradle 26 when it is desired to use said handle for pulling the wagon.

It is to be particularly noted from Figs. 1, 2 and 3 that the handle 14 preferably is made up of two members which will be referred to herein as the lever 27 and the link 28. The lever 27, preferably although not essentially, is constructed of a flat bar of metal as shown in Fig. 2, said bar being bent midway between its ends as indicated at 30 so as to provide two downward parallel extensions which are spaced apart and are connected with each other at their lower ends by an approximately U-shaped clip 31 which is riveted or otherwise suitably secured to the lower ends of the lever 27 so as to provide in effect, a cradle member to receive the upper end of the link 28, as shown in Fig. 2. The link 28, is of such thickness at its upper end, as to fit snugly between the spaced members of the lever 27, and is pivotally connected therewith as indicated at 32 in Figs. 1, 2, 3 and 5, a bushing 33 being preferably mounted in the upper end of the link 28 as shown in Fig. 5 so as to resist wear and snugly surround the pivot bolt 32. The lever 27 and link 28 are adapted to be angularly arranged with relation to each other as shown in Fig. 1 when it is desired to use them as the operating mechanism for the vehicle, and said link and lever are likewise adapted to be moved into alinement with each other as shown in Figs. 2 and 3 and to be locked in such position by means of a locking pin 35 which is adapted to be extended through alining perforations formed in the cradle 31, side bars of the lever 27, and through the link 28 as indicated in Fig. 2. The lock pin 35 preferably is chained as indicated at 37 to the fulcrum pin 32 in order to prevent it from being lost. The lever 27 at the upper end thereof is provided with a transverse grip or handle 38 which is secured to the handle 27 by means such as the bolt 39 which extends between the parallel members of the lever 27 and is connected with a cross piece 40. This means of connecting the grip piece 38 with the lever 27 is strong, simple, durable and inexpensive.

At its lower end, the link 28 is provided with a locking device which preferably includes a bracket or plate 41 having at the lower end thereof an upstanding flange 42, a similar plate 43 being secured to the opposite side of the link 28 and having a downwardly extending flange 44 which fits against the end of the link 28. Mounted for sliding movement upon the plate 43 is a latch 45 which is formed with a longitudinal slot 46 through which extends a bolt 47 which serves to permit the sliding movement of the latch 45. At its upper end the latch 45 is reduced in size and provided with a hooked portion or handle 48 which extends through an eye or guide member 49. Surrounding the reduced portion of the latch 45 is a coil spring 50 which bears at one end against the eye 49 and at the opposite end against the shoulders 51, at the point of intersection of the reduced portion of the latch 45 with the larger portion thereof. The spring 50 serves normally to hold the latch 45 in closed position with its lower end abutting against the flange 42.

The detachable locking device at the lower end of the link 28 is adapted to be engaged with either the cross piece 18 of the bracket 12 on the steering mechanism as shown in Fig. 3, or with a crank member 53 formed on a large gear wheel 54 which is journaled at 55 between the spaced members 6—6 of the frame, said gear wheels 54 being in mesh with a small gear wheel 56 fixed upon the rear driving axle 2.

The forward end of the seat 5 is supported by means of one or more standards 57 secured to the frame members 6 of the car.

Constructed as described, the operation of the device is as follows: When it is desired to pull the car in the ordinary manner, the link 28 is extended in alinement with the lever 27 as shown in Fig. 2 and the locking pin 35 is extended through the cradle member 31 and link 28 so as to lock the link and lever rigidly in alinement with each other. The latch 45 is then drawn upward against the tension of the spring 50 and the flange 42 is fitted downward over the cross piece 18 on the front axle of the car. By releasing the latch 45, the spring 50 then throws said latch downward beneath the cross piece 18 so as to lock the elongated handle in connection with the steering mechanism. The wagon can then be drawn in the usual manner. If it be desired to use the wagon for coasting purpose, the handle 14 is thrown backward into the position shown in Fig. 3, so as to rest in the cradle member 26 which not only limits its rearward movement, but serves to hold it in a rigid enough manner to prevent lateral play. The grip member 38 is then turned in one direction or the other, to guide the wagon, it being understood that the rearwardly and upwardly extending plate 23, together with the cradle member 26 moves pivotally around the pivot point 24 and the upper end of the bolster member 8.

When it is desired to use the car as a hand propelled vehicle, the handle 14 is detached from the bracket 12 by withdrawing the latch 45. The locking pin 35 is then withdrawn from the cradle member 31 and the lower end of the lever 27, together with the cradle member 31 is fitted downward between the spaced members 6 of the wagon frame after which the locking pin 35 is fitted through the perforations 60 in the frame member 6 and through the cradle 31 and lower end of the lever 27. At the same time, the link 28 is locked in engagement with the crank member 53 of the large gear wheel 54 as shown clearly in Fig. 1 of the drawings. The child who desires to drive the wagon, then sits upon the seat 5 with his feet upon the forward axle 11 and his hands upon the gripping member 38, the propelling of the vehicle being effected by hand power and the steering by foot power.

The hand car of the present invention is strong, simple, durable and comparatively inexpensive in construction as well as thoroughly practical and efficient in operation. The number of operating parts is reduced to a minimum.

What is claimed as new is:—

1. A hand-propelled wagon having propelling mechanism, a link detachably connected at its rear end with said propelling mechanism, and a lever having a detachable fulcrum, said lever being connected with the link, whereby the movement of the lever is transmitted through the link to the propelling mechanism, said link and lever being adapted to be locked rigidly together to form a handle for the wagon.

2. A hand propelled wagon having propelling mechanism, a link, a lever, and means for locking said link and lever together to form a handle for the wagon, said lever normally serving as a propelling lever and said link normally connecting the lever with said propelling mechanism.

3. A hand propelled wagon having propelling mechanism and a handle formed of a lever and a link adapted to be overlapped at their ends and locked together, said lever serving normally as a propelling lever for the wagon and being suitably fulcrumed thereon, and said link normally connecting said lever with said propelling mechanism.

4. A hand propelled wagon having propelling mechanism and a handle formed of a lever and link which are adapted to be overlapped at their ends and locked together, said lever being normally fulcrumed at its lower end on said wagon, and said link normally connecting said lever at a point above its fulcrum with said propelling mechanism.

5. A hand car having propelling mechanism, steering mechanism, a lever adjustably fulcrumed on said hand car, and a link pivotally connected with said lever at a point above its fulcrum and adjustably connected at its opposite end with the propelling mechanism, said link and lever being adapted to be disconnected from said car and propelling mechanism respectively and locked in alinement with each other to form a handle, the lower end of said handle being provided with means for locking it to said steering mechanism.

6. A hand car having propelling mechanism, steering mechanism, a lever detachably connected with said hand car, and a link located between the lever and propelling mechanism pivotally connected with said lever and detachably connected with said propelling mechanism, said link being adapted to be detachably connected with said steering mechanism.

7. A hand car having a frame, driving mechanism provided with a crank, steering mechanism, a lever pivotally and detachably connected with said frame, and a link located between the lever and propelling mechanism and pivotally connected with said lever and detachably connected with said crank, said link being adapted to be locked in alinement with said lever and detachably connected with said steering mechanism.

8. A car having propelling mechanism and steering mechanism, a lever, a link pivotally connected with the lever, and a locking device on the link adapted to be engaged with either the propelling or steering mechanism.

9. A car having propelling mechanism, steering mechanism, a lever, a link pivotally connected with the lever, a locking device on the link adapted to be engaged with either the propelling or steering mechanism, and an operating member for the locking device extending longitudinally of the link.

10. A car having propelling mechanism, a crank connected with the propelling mechanism, steering mechanism, a lever, a link pivotally connected with the lever, and a locking device on said link adapted to be engaged with either said crank or said steering mechanism.

11. A car having a frame, propelling mechanism, steering mechanism, a lever adapted to be detachably and pivotally connected at one end with said frame, and a link pivotally connected with said lever intermediate the ends thereof, said link being adapted to be detachably connected with either the propelling or steering mechanism.

12. A car having propelling mechanism, steering mechanism provided with a cradle, a lever, and a link pivotally connected with said lever and adapted to be locked in alinement therewith, said link being adapted to be detachably connected with either the propelling or steering mechanism and to be moved into engagement with said cradle when connected with said steering mechanism.

13. A car having a frame, propelling mechanism, a lever pivotally and detachably connected with said frame, a link pivotally connecting said lever with said propelling mechanism, means for locking said link in alinement with said lever and means for detachably connecting the link with the steering mechanism.

14. A car having a frame, drive wheels journaled thereon, a crank member for operating said drive wheels, a hand lever pivotally and detachably connected with said frame, a link pivotally connected with said hand lever intermediate its ends, a locking device on said link adapted to be connected with said crank, a forward bolster member connected with said frame, a front axle pivoted on the lower end of said bolster member, front wheels on said axle, a forwardly extending bracket on said front axle, a forward cross piece on said bracket, adapted to receive the locking device of said link, a second crosspiece in rear of said first mentioned cross piece, an upwardly and rearwardly extending arm connected with said second cross piece at its lower end and pivotally mounted at its upper end on the upper end of said bolster member, a cradle mounted on said upwardly and rearwardly extending arm, and adapted to receive said link when said locking device is connected with said first mentioned cross piece, and means for locking said link and said lever in alinement with each other.

In testimony that I claim the foregoing as my own, I have hereto affixed my signature in the presence of two witnesses.

JAMES A. SHERRY.

Witnesses:
F. B. OCHSENREITER,
W. H. CRICHTON CLARKE.

---

Copies of this patent may be obtained for five cents each, by addressing the "Commissioner of Patents. Washington, D. C."